United States Patent [19]

Ida

[11] Patent Number: 4,805,485
[45] Date of Patent: Feb. 21, 1989

[54] POWER TRANSFER DEVICE FOR FOUR-WHEEL DRIVE VEHICLES

[75] Inventor: Shuichiro Ida, Toyota, Japan

[73] Assignee: Toyota Jidosha Kabushiki Kaisha, Aichi, Japan

[21] Appl. No.: 36,359

[22] Filed: Apr. 9, 1987

[30] Foreign Application Priority Data

Apr. 10, 1986 [JP] Japan ................. 61-82680

[51] Int. Cl.$^4$ .............. F16H 37/06; F16H 1/44
[52] U.S. Cl. .................... 74/674; 74/710.5;
74/785; 180/250
[58] Field of Search .......... 74/674, 714, 710.5,
74/785, 750 R, 665 T, 665 GA; 180/248, 249, 250

[56] References Cited

U.S. PATENT DOCUMENTS

| 3,477,314 | 11/1969 | Rutkowski | 74/750 R |
| 3,895,546 | 7/1975 | Yamaguchi et al. | 74/710.5 |
| 4,063,470 | 12/1977 | Kelbel | 74/750 R X |
| 4,074,591 | 2/1978 | Dick | 74/674 |
| 4,103,753 | 8/1978 | Holdeman | 74/785 X |
| 4,188,838 | 2/1980 | Nakao et al. | 74/665 T |
| 4,347,762 | 9/1982 | Holdeman | 74/750 R X |
| 4,462,274 | 7/1984 | Reppert et al. | 74/750 R X |
| 4,569,252 | 2/1986 | Harper | 74/785 |
| 4,604,908 | 8/1986 | Dolan | 74/785 |
| 4,677,873 | 7/1987 | Eastman et al. | 74/714 X |
| 4,677,875 | 7/1987 | Batchelor | 74/714 X |

Primary Examiner—Allan D. Herrmann
Assistant Examiner—David Novais
Attorney, Agent, or Firm—Parkhurst, Oliff & Berridge

[57] ABSTRACT

A power transfer device includes a planetary gear unit which includes a sun gear, a carrier, a ring gear, and a plurality of planet gears journaled on the carrier and in mesh with the sun and ring gears. The planetary gear unit is shiftable between first, second and third positions to establish a high speed two-wheel drive mode in the first position wherein the carrier is engaged with an input shaft and a first output shaft, and the sun gear is engaged with a second output shaft, and the ring gear is disengaged. The planetary gear unit is arranged to establish a high speed four-wheel drive mode in the second position wherein the carrier is engaged with the input shaft and the first output shaft, and the sun gear is engaged with the input shaft and the second output shaft, and the ring gear is disengaged to restrict differential action between the output shafts and is further arranged to establish a low speed four-wheel drive mode in the third position wherein the sun gear is engaged with the input shaft, the carrier is engaged with the output shafts, and the ring gear is locked to restrict the differential action.

5 Claims, 6 Drawing Sheets

POWER TRANSFER DEVICE FOR FOUR-WHEEL DRIVE VEHICLES

BACKGROUND OF THE INVENTION

1. Field of the Invention

The present invention relates to a power transfer device for four-wheel drive vehicles, and more particularly to a power transfer device of the type which includes a planetary gear unit arranged to be shifted between high and low-range conditions to establish torque proportioning and locked-up reduction drive modes.

2. Description of the Prior Art

In U.S. Pat. No. 4,074,591 granted to Dick on Feb. 21, 1978, there has been proposed a shift mechanism for the planetary gear unit which may be shifted to establish a high-range mode wherein the carrier acts as an input member and the sun and ring gears as output members to establish torque proportioning differential action. The shift mechanism may be further shifted to establish a low-range mode wherein the sun gear acts as an input member, the ring gear as a reaction member, and the carrier as an output menber to provide locked-up reduction dribe.

The shift mechanism includes a pair of shifting sleeves which are axially slidably mounted on an input shaft and one output shaft and which are linked together by a ring such that they are slidable as a unit but rotatable relative to one another. The shifting sleeves each support thereon a floating collar. the other output shaft is in the form of a hollow shaft arranged in surrounding relationship with the input shaft. In the high-range mode, one of the shifting sleeves engages the input shaft with the carrier, and its associated floating collar engages the sun fear with the other output shaft. The other sleeve engages the ring gear with the one output shaft, and its associated floating collar is disengaged. In the low-range mode, the one sleeve engages the input shaft with the sun gear, and its associated floating collar engages the carrier with the other output shaft. The other sleeve engages the carrier with the one output shaft, and its associated floating collar locks the ring gear to the housing.

In a practical emcbodiment of such a power transfer device as described above, it is desirable that the planetary gear unit is further arranged to establish a high-range mode under restriction of the differential action so as to enhance driving performance of the vehicle on a road covered with snow.

SUMMARY OF THE INVENTION

It is, therefore, a primary object of the present invention to provide an improved power transfer device wherein the planetary gear unit is shifted between three positions to establish a high speed four-wheel drive mode under torque proportioning differential action and to establish high and low speed four-wheel drive modes under restriction of the differential action.

Another object of the present invention is to provide an improved power transfer device, having the above-described characteristics, wherein the shifting operation of the planetary gear unit is effected in a simple construction without the provision of any clutch sleeve.

A further object of the present invention is to provide an improved power transfer device, having the above-described characteristics, capable of eliminating loads acting on teeth of the gear parts of the planetary gear unit during restriction of the differential action.

According to the present invention briefly summarized, there is provided a power transfer device which comprises a housing, an input shaft rotatably mounted within the housing for drive connection to the output shaft of a power transmission, a first output shaft rotatably mounted within the housing in a coaxial relationship with the input shaft, a second output shaft rotatably mounted within the housing in a concentric relationship with the input shaft, and a planetary gear unit including a sun gear, a carrier, a ring gear and a plurality of planet gears journaled on the carrier and in mesh with the sun and ring gears and being axially slidably mounted on the input and output shafts.

The planetary gear unit is shiftable between first, second and third positions to establish a high speed two-wheel drive mode in the first position wherein the carrier is engaged with the input shaft and the first output shaft, the sun gear is engaged with the second output shaft, and the ring gear is disengaged, the planetary gear unit being arranged to establish a high speed four-wheel drive mode in the second position wherein the carrier is engaged with the input shaft and the first output shaft, the sun gear is engaged with the input shaft and the second output shaft, and the ring gear is disengaged to restrict differential action between the output shafts and being further arranged to establish a low speed four-wheel drive mode in the third position wherein the sun gear is engaged with the input shaft, the carrier is engaged with the output shafts, and the ring gear is locked by engagement with the housing to restrict the differential action betwen the output shafts.

BRIEF DESCRIPTION OF THE DRAWINGS

Additional objects, features and advantages of the present invention will be readily appreciated from the following detailed description of preferred embodiments thereof when considered with reference to the accompanying drawings, in which.

DESCRIPTION OF THE PREFERRED EMBODIMENTS

Figure 1:
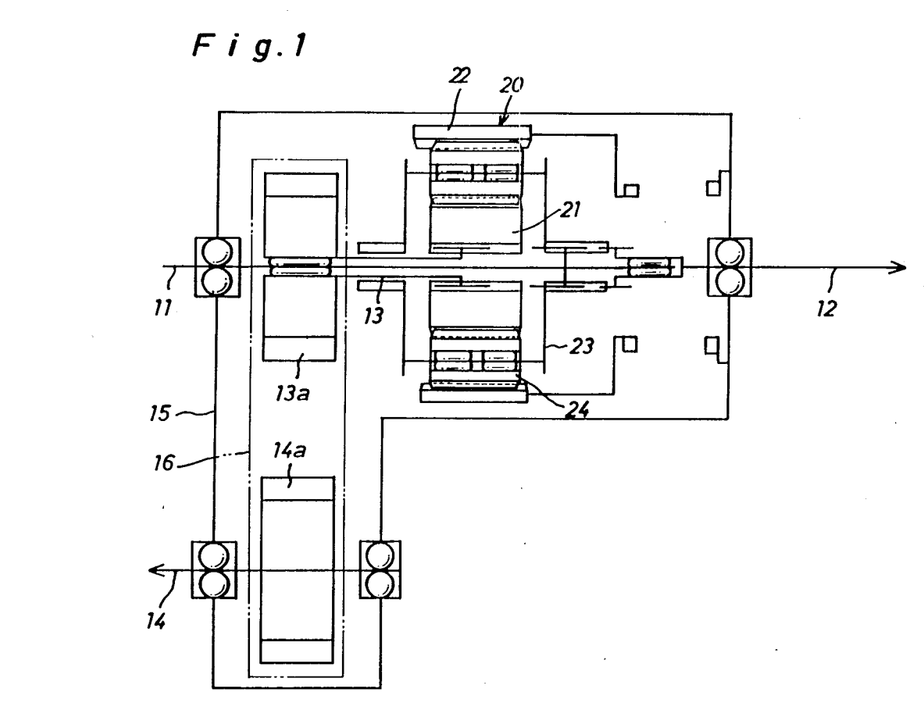
FIG. 1 is a schematic illustration of a preferred embodiment of a power transfer device in accordance with the present invention.

In FIG. 1 of the drawings, there is schematically illustrated a preferred embodiment of a power transfer device in accordance with the present invention which is drivingly connected to the output shaft of a power transmission (not shown) in an associated part-time four-wheel drive vehicle. The power transfer device includes an input shaft 11 for drive connection to the output shaft of the power transmission, a first output shaft 12 for drive connection to a rear-wheel propeller shaft (not shown), second and third output shafts 13 and 14 for drive connection to a front-wheel propeller shaft (not shown), and a planetary or epicyclic gear unit 20 axially slidably mounted on the input and output shafts 11, 12, 13.

The input and output shafts 11 and 12 are rotatably mounted within a housing 15 in a coaxial relationship and coupled at their inner ends with each other for relative rotation. The second output shaft 13 is in the form of a hollow shaft which is integrally provided thereon with a drive sprocket 13a and rotatably mounted in place within the housing 15 in a surrounding relationship with the input shaft 11. The third output shaft 14 is integrally provided thereon with a driven sprocket 14a and rotatably mounted within the housing 15 in parallel with the input and output shafts 11 and 13. The second and third output shafts 13 and 14 are drivingly connected to each other by means of a chain 16 stretched over the drive and driven sprockets 13a and 14a. The third output shaft 14 is further drivingly connected to the front-wheel propeller shaft.

Figure 2:
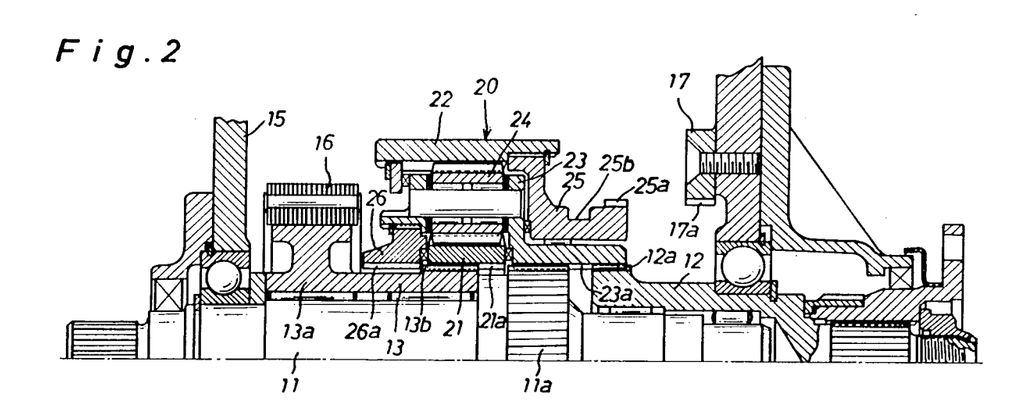
FIGS. 2 to 5 each are a sectional view showing details of the component parts of a planetary gear unit shown in FIG. 1.

The planetary gear unit 20 includes a sun gear 21, a ring gear 22, a carrier 23 and a plurality of planet gears 24 journaled on the carrier 23 and in mesh with the sun and ring gears 21 and 22. As shown clearly in FIG. 2, the sun gear 21 has an internal spline 21a in meshing engagement with an external spline 13b formed on output shaft 13 and engageable with an external spline 11a formed on input shaft 11. The ring gear 22 includes an annular spline piece 25 rigidly secured thereto which is coupled over the carrier 23 for relative rotation and has an external spline 25a engageable with an internal spline 17a formed on a stationary annular spline piece 17 rigidly secured to an inner wall of the housing 15. The carrier 23 has an internal spline 23a in meshing engagement with the external spline 11a on input shaft 11 and an external spline 12a formed on an output shaft 12 and includes an annular spline piece 26 rigidly secured thereto which has an internal spline 26a engageable with the external spline 13b on output shaft 13.

The planetary gear unit 20 is arranged to be shifted between four positions respectively illustrated in FIGS. 2, 3, 4 and 5. For shifting the planetary gear unit 20, the annular spline piece 25 is formed with an annular groove 25b which is coupled with a manually operated shift fork (not shown). Assuming that the planetary gear unit 20 is retained in the position shown in FIG. 2, the sun gear 21 is maintained in engagement with the second output shaft 13, the ring gear 22 is disengaged, and the carrier 23 is maintained in engagement with the input and output shafts 11 and 12. In such a condition, the carrier 23 acts as an input member to transfer the power from inut shaft 11 to the first output shaft 12 therethrough, while the sun gear 21 is freely rotated on the second output shaft 13. Thus, only the first output shaft 12 is driven at the same rotational speed as that of the input shaft 11 to establish a high speed two-wheel drive mode under differential action between the output shafts 12 and 13.

Figure 3:
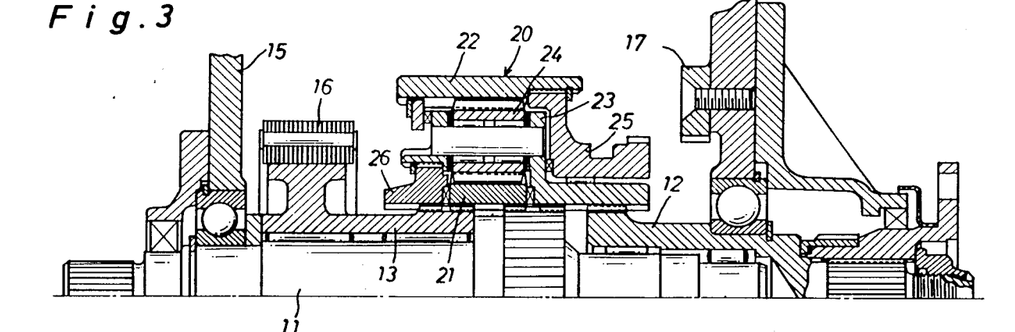

When the planetary gear unit 20 is shifted to and retained in the position shown in FIG. 3, the sun gear 21 is maintained in engagement with the input and output shafts 11 and 13, the ring gear 22 is disengaged, and the carrier 23 is maintained in engagement with the input and output shafts 11 and 12 and in drive connection to the second output shaft 13 through its associated spline piece 26. In such a condition, the sun gear 21 and carrier 23 are drivingly connected with each other through the shafts 11-13 to restrict differential action between the output shafts 12 and 13. Thus, the sun gear 21 and carrier 23 act as input members to transfer the power from input shaft 11 to the first and second output shafts 12 and 13 therethrough. As a result, the output shafts 12 and 13 are driven at the same rotational speed as that of the input shaft 11 to establish a high speed four-wheel drive mode under restriction of the differential action between the output shafts 12 and 13.

Figure 4:
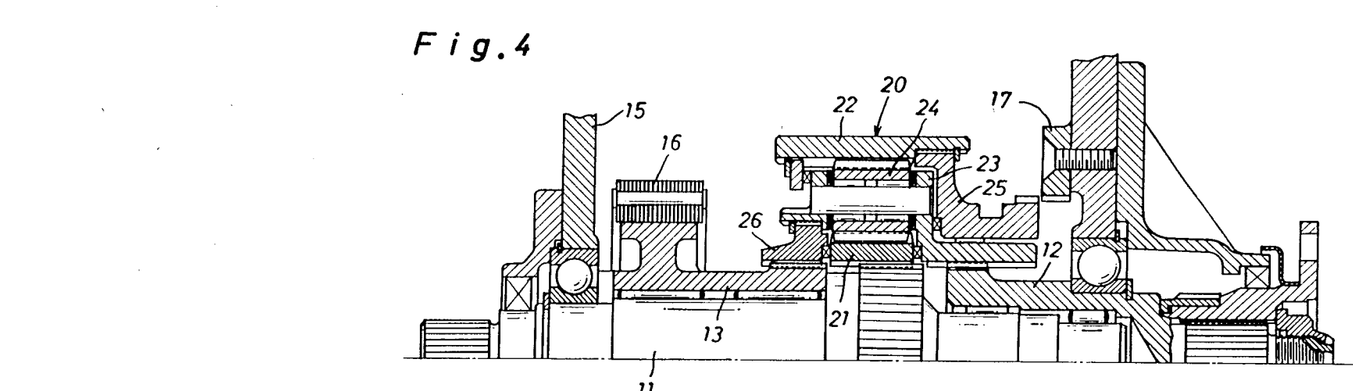

When the planetary gear unit 20 is shifted to and retained in the position shown in FIG. 4, the sun gear 21 is maintained in engagement with the input shaft 11, the carrier 23 is maintained in engagement with the first output shaft 12 and in drive connection to the second output shaft 13 through its associated spline piece 26, and the ring gear 22 is disengaged. In such a condition, the carrier 23 is positioned to permit free rotation of the sun, planet and ring gears 21, 24 and 22. Thus, the power from input shaft 11 may not be transferred to the output shafts 12 and 13. This is effective to maintain the power transfer device in a neutral condition.

Figure 5:
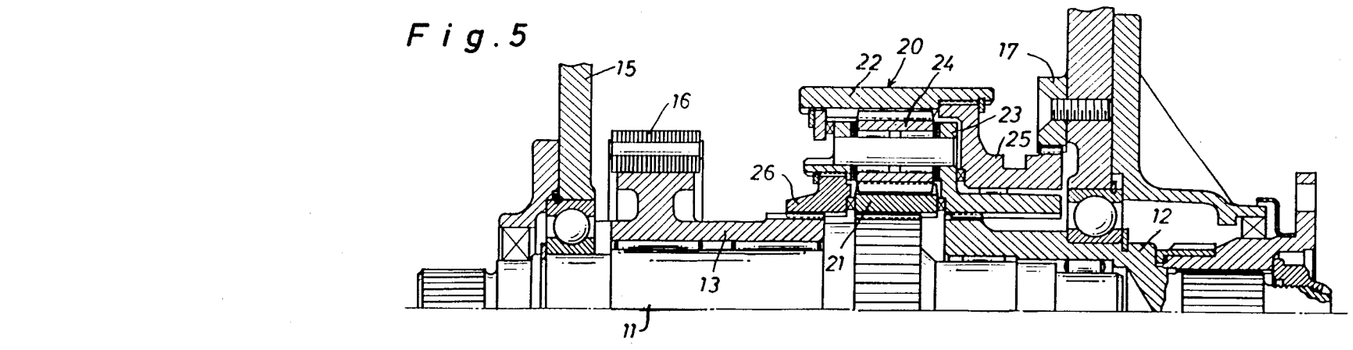

When the planetary gear unit 20 is shifted to and retained in the position shown in FIG. 5, the sun gear 21 is maintained in engagement with the input shaft 11, the ring gear 22 is locked by engagement with the stationary spline piece 17 through its associated spline piece 25, and the carrier 23 is maintained in engagement with the first output shaft 12 and in drive connection to the second output shaft 13 through its associated spline piece 26. In such a condition, the sun gear 21 acts as an input member, the ring gear 22 as a reaction member, and the carrier 23 as an output member to provide locked-up reduction drive. Thus, the power from input shaft 11 is transferred to the carrier 23 through the sun and planet gears 21 and 14, and subsequently the carrier 23 acts to transfer the power to the output shafts 12 and 13 therethrough. As a result, the output shafts 12 and 13 are driven by the input shaft 11 at a reduction speed ratio to establish a low speed four-wheel drive mode under restriction of the differential action between the output shafts 12 and 13.

From the above description, it will be understood that in the power transfer device, the high speed two-wheel drive mode and the high and low speed four-wheel drive modes are selectively established by shifting operation of the entire planetary gear unit 20. This is effective to enhance driving performance of the part-time four-wheel drive vehicle. Furthermore, the neutral condition of the power transfer device is provided by shifting operation of the entire planetary gear unit 20. It is, therefore, able to adapt the power transfer device to an industrial vehicle equipped with a power take-off device. Additionally, it will be understood that the shifting operation of the entire planetary gear unit 20 is effected without the provision of any conventional clutch sleeve. This is useful to reduce the component parts of the power transfer device so as to simplify the construction of the same. In the power transfer device, it is to be noted that the component parts of the planetary gear unit 20 are selectively engaged at their internal or external splines with the external splines of shafts 11–13 or the internal spline of stationary spline piece 17. This is useful to eliminate loads acting on the teeth of the respective gear parts 21, 22, 24 during restriction of the differential action.

Figure 6:
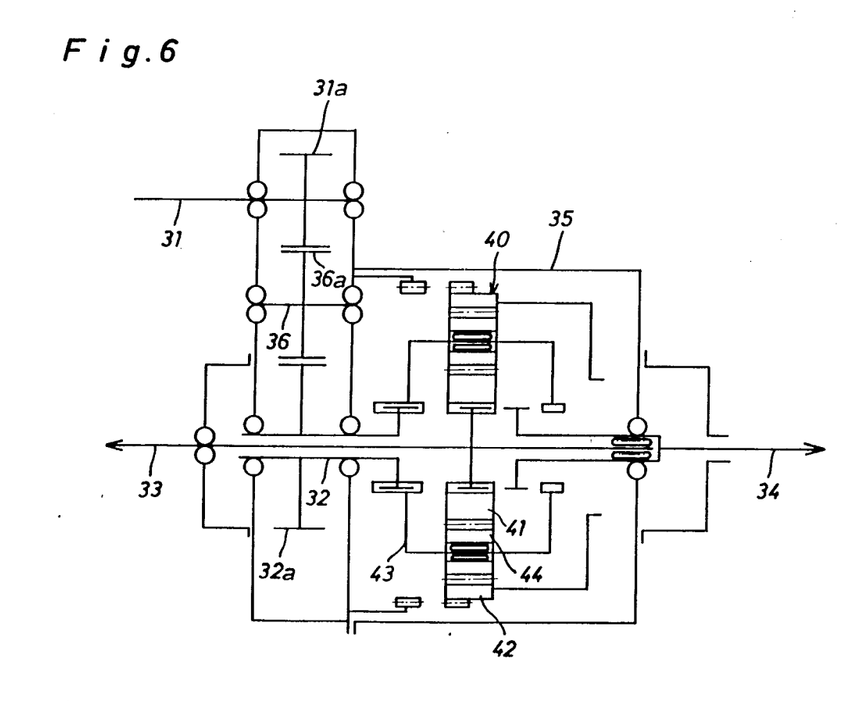
FIG. 6 is a schematic illustration of another embodiment of a power transfer device in accordance with the present invention.

In FIG. 6 there is schematically illustrated another preferred embodiment of a power transfer device in accordance with the present invention which is drivingly connected to the output shaft of a conventional power transmission (not shown) in an associated part-time four-wheel drive vehicle. The power transfer device includes first and second input shafts 31 and 32 for drive connection to the output shaft of the power transmission, a first output shaft 33 for drive connection to a front-wheel propeller shaft (not shown), a second output shaft 34 for drive connection to a rear-wheel propeller shaft (not shown), and a planetary gear unit 40 axially slidably mounted on the input and output shafts 32, 33 and 34.

The first and second input shafts 31 and 32 are arranged in parallel to each other and rotatably mounted within a housing 35. The first input shaft 31 is integrally provided thereon with a gear 31a which is in mesh with an idler gear 36a on an idler shaft 36, while the second input shaft 32 is integrally provided thereon with a gear 32a which is in mesh with the idler gear 36a for drive connection to the gear 31a on input shaft 31. The idler shaft 36 is arranged between the input shafts 31 and 32 in parallel therewith and rotatably mounted within the housing 35. In this embodiment, the second input shaft 32 is in the form of a hollow shaft arranged in surrounding relationship with the first output shaft 33. The first and second output shafts 33 and 34 are rotatably mounted within the housing 35 in a coaxial relationship and coupled with each other at their inner ends for relative rotation.

Figure 7:
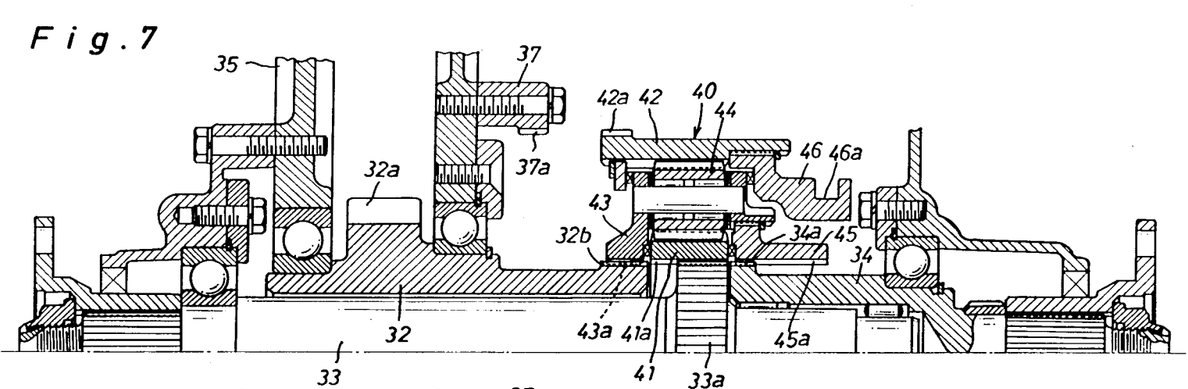
FIGS. 7 to 10 each are a sectional view showing details of the component parts of a planetary gear unit shown in FIG. 6.

The planetary gear unit 40 includes a sun gear 41, a ring gear 42, a carrier 43 and a plurality of planet gears 44 journaled on the carrier 43 and in mesh with the sun and ring gears 41 and 42. As shown clearly in FIG. 7, the sun gear 41 has an internal spline 41a in meshing engagement with an external spline 33a formed on output shaft 33 and engageable with an external spline 32b formed on input shaft 32. The ring gear 42 is formed thereon with an external spline 42a which is arranged to be engaged with an interral spline 37a formed on a stationary annular spline piece 37 rigidly secured to an inner wall of the housing 35. The ring gear 42 includes an annular member 46 rigidly secured thereto which is formed with an annular groove 46a coupled with a manually operated shift fork (not shown) for shifting the entire planetary gear unit 40. The carrier 43 has an internal spline 43a in meshing engagement with the external spline 32b on input shaft 32. The carrier 43 includes an annular spline piece 45 rigidly secured thereto which has an internal spline 45a engageable with an external spline 34a formed on output shaft 34.

The planetary gear unit 40 is arranged to be shifted between four positions respectively illustrated in FIGS. 7, 8, 9 and 10. Assuming that the planetary gear unit 40 is retained in the position shown in FIG. 7, the sun gear 41 is maintained in engagement with the first output shaft 33, the ring gear 42 is disengaged, and the carrier 43 is maintained in engagement with the input shaft 32 and in drive connection to the second output shaft 34 through its associated spline piece 45. In such a condition, the carrier 43 acts as an input member to transfer the power from input shaft 32 to the output shaft 34 therethrough, while the sun gear 41 is freely rotated on the first output shaft 33. Thus, only the second output shaft 34 is driven at the same rotational speed as that of the input shaft 32 to establish a high speed two-wheel drive mode under differential action between the output shafts 33 and 34.

Figure 8:
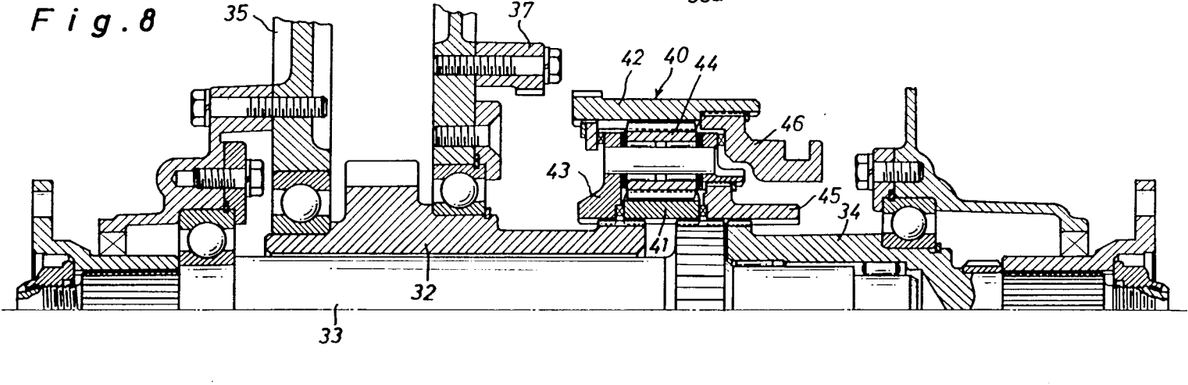

When the planetary gear unit 40 is shifted to and retained in the position shown in FIG. 8, the sun gear 41 is maintained in engagement with the input and output shafts 32 and 33, the carrier 43 is maintained in engagement with the input shaft 32 and in drive connection to the output shafts 33 and 34 through its associated spline piece 45, and the ring gear 42 is disengaged. In such a condition, the sun gear 41 and carrier 43 are drivingly connected to each other through the shafts 32, 33 and 34 to restrict differential action between the shafts 33 and 34. Thus, the power from input shaft 32 is transferred to the first output shaft 33 through the sun gear 41 and to the second output shaft 34 through the carrier 43. This is effective to drive the output shafts 33 and 34 at the same rotational speed as that of the input shaft 32 so as to establish a high speed four-wheel drive mode under restriction of the differential action.

Figure 9:
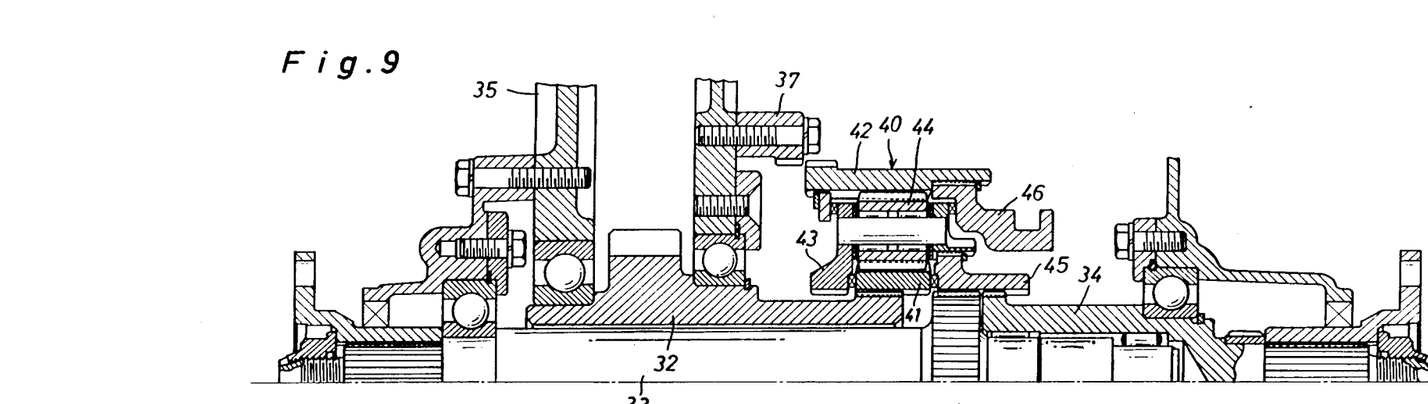

When the planetary gear unit 40 is shifted to and retained in the position shown in FIG. 9, the sun gear 41 is disengaged from the first output shaft 33 and maintained in engagement with the input shaft 32, while the carrier 43 is maintained in drive connection to the output shafts 33 and 34 through its associated spline piece 45, and the ring gear 42 is disengaged. In such a condition, the carrier 43 is positioned to permit free rotation of the sun, planet and ring gears 41, 44 and 42. Thus, the power from input shaft 32 may not be transferred to the output shafts 33 and 34. This is effective to maintain the power transfer device in a neutral condition.

Figure 10:
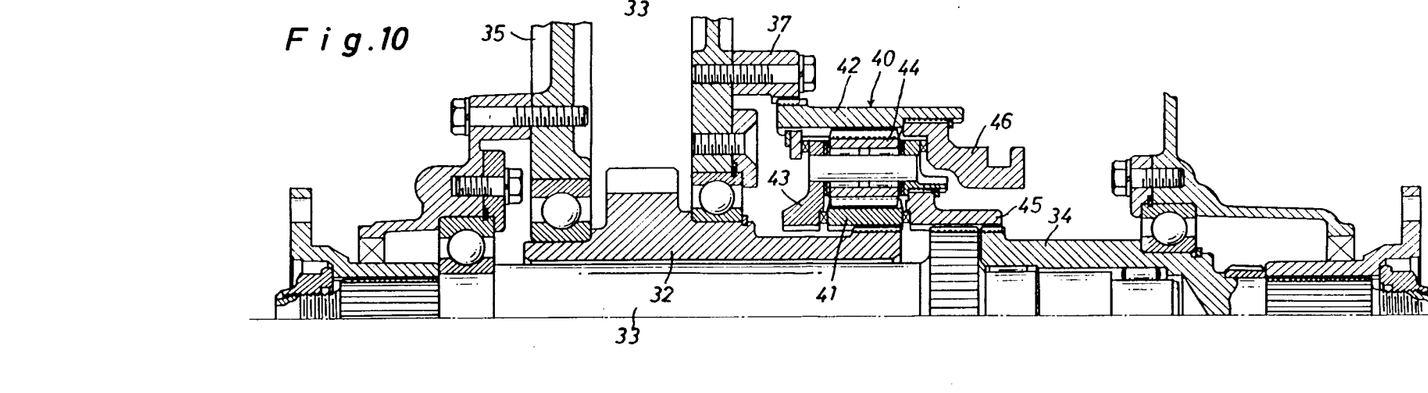

When the planetary gear unit 40 is shifted to and retained in the position shown in FIG. 10, the sun gear 41 is maintained in engagement with the input shaft 32, the ring gear 42 is locked by engagement with the stationary spline piece 37, and the carrier 43 is maintained in drive connection to the output shafts 33 and 34 through its associated spline piece 45. In such a condition, the sun gear 41 acts as an input member, the ring gear 42 as a reaction member, and the carrier 43 as an output member to transfer the power from input shaft 32 to the output shafts 33 and 34 therethrough. Thus, the output shafts 33 and 34 are driven at a reduction speed ratio to establish a low speed four-wheel drive mode under restriction of the differential action between the output shafts 33 and 34.

Having now fully set forth structure and operation of preferred embodiments of the concept underlying the present invention, various other embodiments as well as certain modifications and variations of the embodiments shown and described herein will obviously occur to those skilled in the art upon becoming familiar with said underlying concept. It is to be understood, therefore, that within the scope of the appended claims, the invention may be practiced otherwise than as specifically set forth herein.

What is claimed is:

1. A power transfer device for four-wheel drive vehicles, comprising:
 a housing;
 an input shaft rotatably mounted within said housing for drive connection to an output shaft of a power transmission;
 a first output shaft rotatably mounted within said housing in a coaxial relationship with said input shaft;
 a second output shaft rotatably mounted within said housing in a concentric relationship with said input shaft; and
 a planetary gear unit including a sun gear, a carrier, a ring gear, and a plurality of planet gears journaled on said carrier and in mesh with said sun and ring gears and being axially slidably mounted on said input and output shafts;

wherein said planetary gear unit is shiftable between first, second and third positions to establish a high speed two-wheel drive mode in the first position wherein said carrier is engaged with said input shaft and said first output shaft, said sun gear is engaged with said second output shaft, and said ring gear is disengaged, said planetary gear unit being arranged to establish a high speed four-wheel drive mode in the second position wherein said carrier is engaged with said input shaft and said first output shaft, said sun gear is engaged with said input shaft and said second output shaft, and said ring gear is disengaged to restrict differential action between said output shafts and being further arranged to establish a low speed four-wheel drive mode in the third position wherein said sun gear is engaged with said input shaft, said carrier is engaged with said output shafts, and said ring gear is locked by engagement with said housing to restrict the differential action between the output shafts.

2. A power transfer device as recited in claim 1, wherein said input shaft is coupled at an inner end thereof with an inner end of said first output shaft for relative rotation, and said second output shaft is in the form of a hollow shaft arranged in surrounding relationship with said input shaft.

3. A power transfer device as recited in claim 1, wherein said input shaft is in the form of a hollow shaft arranged in surrounding relationship with said second output shaft, and said first output shaft is coupled at an inner end thereof with an inner end of said second output shaft for relative rotation.

4. A power transfer device as recited in claim 1, wherein said sun gear has an internal spline engageable with external splines each formed on said input shaft and said second output shaft, and said carrier has an internal spline engageable with the external spline on said input shaft and an external spline formed on said first output shaft, and wherein said ring gear includes an annular spline piece secured thereto which is coupled over said carrier for relative rotation and has an external spline engageable with an internal spline of a stationary annular spline piece secured to an inner wall of said housing, and said carrier includes an annular spline piece secured thereto which has an internal spline engageable with the external spline on said second output shaft.

5. A power transfer device as recited in claim 1, wherein said sun gear has an internal spline engageable with external splines each formed ons aid input shaft and said second output shaft, said carrier has an internal spline engageable with the external spline on said input shaft, and said ring gear has an external spline engageable with an internal spline of a stationary annular spline piece secured to an inner wall of said housing, and wherein said carrier includes an annular spline piece secured thereto which has an internal spline engageable with an external spline formed on said first output shaft.

* * * * *